United States Patent [19]

Chin et al.

[11] Patent Number: 5,672,819
[45] Date of Patent: Sep. 30, 1997

[54] FORMATION EVALUATION USING PHASE SHIFT PERIODIC PRESSURE PULSE TESTING

[75] Inventors: Wilson C. Chin; Mark A. Proett, both of Houston, Tex.

[73] Assignee: Halliburton Energy Services, Inc., Houston, Tex.

[21] Appl. No.: 615,655

[22] Filed: Mar. 13, 1996

[51] Int. Cl.$^6$ .................................................. E21B 49/00
[52] U.S. Cl. ............................................................ 73/152.41
[58] Field of Search ........................... 73/152.05, 152.06, 73/152.39, 152.41

[56] References Cited

U.S. PATENT DOCUMENTS

| | | | |
|---|---|---|---|
| 2,747,401 | 5/1956 | Doll | 73/152.41 X |
| 3,289,474 | 12/1966 | Smith | 73/152.41 |
| 4,742,459 | 5/1988 | Lasseter | 73/152.41 X |
| 5,269,180 | 12/1993 | Dave et al. | 73/152.06 |

*Primary Examiner*—Michael Brock

[57] ABSTRACT

The present invention provides an apparatus and method for determining geologic formation properties. A pressure wave is generated by a reciprocating piston transmitted to the formation by a probe. The pressure is sensed by a high accuracy quartz gauge in the probe. This pressure is compared to the pressure sensed at a spaced probe or to the flow rate of the piston to calculate permeability or other formation properties.

23 Claims, 2 Drawing Sheets

5,672,819

FORMATION EVALUATION USING PHASE SHIFT PERIODIC PRESSURE PULSE TESTING

BACKGROUND OF THE INVENTION

1. Field of the Invention

The present invention relates to methods and apparatus for testing geologic formations. More particularly, the invention relates to methods and apparatus that use pressure waves to measure formation properties.

2. Background of the Prior Art

The determination of permeability and other hydraulic properties of hydrocarbon bearing formations surrounding boreholes is very useful in gauging the produceability of the hydrocarbons of those formations. It is also useful in obtaining an overall understanding of the structure of the formations.

Permeability can be determined by taking and analyzing core samples from the formation. However, this is a difficult and time consuming process. Therefore, various methods have been developed for determining the permeability of a formation in situ.

The primary technique that is currently used for determining permeability is the "drawdown" method. In this method, a probe in a formation testing tool is placed against a borehole wall and the pressure inside the tool is lowered below the pressure of the formation thus Another technique for measuring permeability is disclosed in U.S. Pat. Nos. 4,860,581 and 4,936,139 to Zimmerman et al. These patents disclose apparatus which withdraw fluid from a formation. These patents disclose the use of multiple probes as well as the use of a straddle packer in the testing tool.

Still another method of determining formation permeability is disclosed in U.S. Pat. No. 5,269,180. This patent discloses a method for making permeability measurements by sequentially injecting either clean oil or water into a formation followed by injection of the other fluid into the formation. The order in which the oil and water are injected is based of the type of mud used during drilling. The patent teaches that the sequential injection of clean water and clean oil proceeded and separated by cleaning of the flow lines provides a method for determining end point effective permeability determinations and therefore end point relative permeability determinations. The determinations are made by measuring the pressure seen at the probe (of known diameter) during steady-state injection conditions of known flow rate in order to calculate mobility of the fluid phase being injected. The mobility is related to end point effective permeability via the viscosity of the liquid being injected.

The evaluation of formation properties from phase delays, also known as time delays, obtained in well transient analysis, is not new. Various references can be found in the reservoir description literature for multi-well interference testing. These methods are discussed in Streltsova, "Well Testing in Heterogenous Formations," John Wiley and Sons, N.Y., pp. 125–133, 1988, where asymptotic properties of exact Bessel function solutions developed by Businov and Umrichin are derived for application to formation evaluation.

Additionally, Earlougher, "Advances in Well Test Analysis," pp. 111–118, Society of Petroleum Engineers, Richardson, Texas, 1977, describes applications where a series of short duration pulses are created at production wells and monitored at observation wells. Formation properties are determined using interpretation charts developed from mathematical models of the transient Darcy flow.

The basic physical ideas are clear and have been amply demonstrated for cylindrical radial flows, for use in well transient analysis where the entire length of a straight, long well produces under strictly cylindrical radial conditions.

However, these methods do not address the issue of spherical flows usually encountered at early times by wireline formation tester probes. Accordingly, it would be a significant advancement in the art to provide a formation tester and method for evaluating formation properties from phase delays obtained in transient well analysis. Such an apparatus and method are disclosed and claimed herein.

BRIEF SUMMARY OF THE INVENTION

The present invention provides a method and apparatus for testing geologic formations using pressure waves. In a first preferred embodiment a first probe in the tester generates a sinusoidal pressure wave in a geologic formation. A second probe located a short distance from the first probe within the same azimuthal angle senses properties of the wave to produce a time domain pressure plot which is used to calculate the amplitude or phase of the wave. The tool then compares properties of the sensed wave with properties of the propagated wave to obtain values which can be used in the calculation of formation properties. For example, phase shift between the propagated and sensed wave or amplitude decay can be determined. These measurements can be related back to formation properties via a mathematical model.

In the first preferred embodiment of the present invention, the frequency of the generated wave is between about 1 and about 100 hertz. The spacing between the two probes is about 4 to 10 inches. The pressure wave in each probe is recorded with a high accuracy quartz gauge.

A typical test sequence begins with the tool being extended into a borehole. The probes and backup pads are extended such that the first and second probes are placed in direct communication with the borehole wall. A piston within the tester is moved with a sinusoidal displacement to produce a pressure wave at the first probe. The amplitude of the pressure is controlled by a feedback loop that determines the displacement of the piston.

The pressure wave propagates in a diffusive manner to the second probe where its amplitude is diminished and the phase angle is delayed. The second probe detects the signal which is recorded by a pressure gauge connected to the second probe. By comparing the amplitude and phase change of the response signal to the propagated signal, an accurate estimate of permeability can be made.

In alternative embodiments of the invention, additional probes can be oriented either vertically or horizontally from the first probe. In a second preferred embodiment, a third probe is horizontally positioned with respect to the first probe. With the addition of a horizontal probe, the horizontal to vertical permeability anisotropy can be estimated by comparing the measurements made at the two sensing probes.

In a third preferred embodiment, a single probe is used and a comparison of the amplitude or phase of displacement of the piston with the amplitude or phase of the pressure of the generated wave is used to calculate permeability or other properties of the formation.

DETAILED DESCRIPTION OF THE PREFERRED EMBODIMENTS

The present invention provides a unique method and apparatus for testing geologic formations using pressure waves generated by a wireline tester. The invention is best understood by reference to the following description and attached drawings in which like parts are designated with like numerals.

Figure 1:
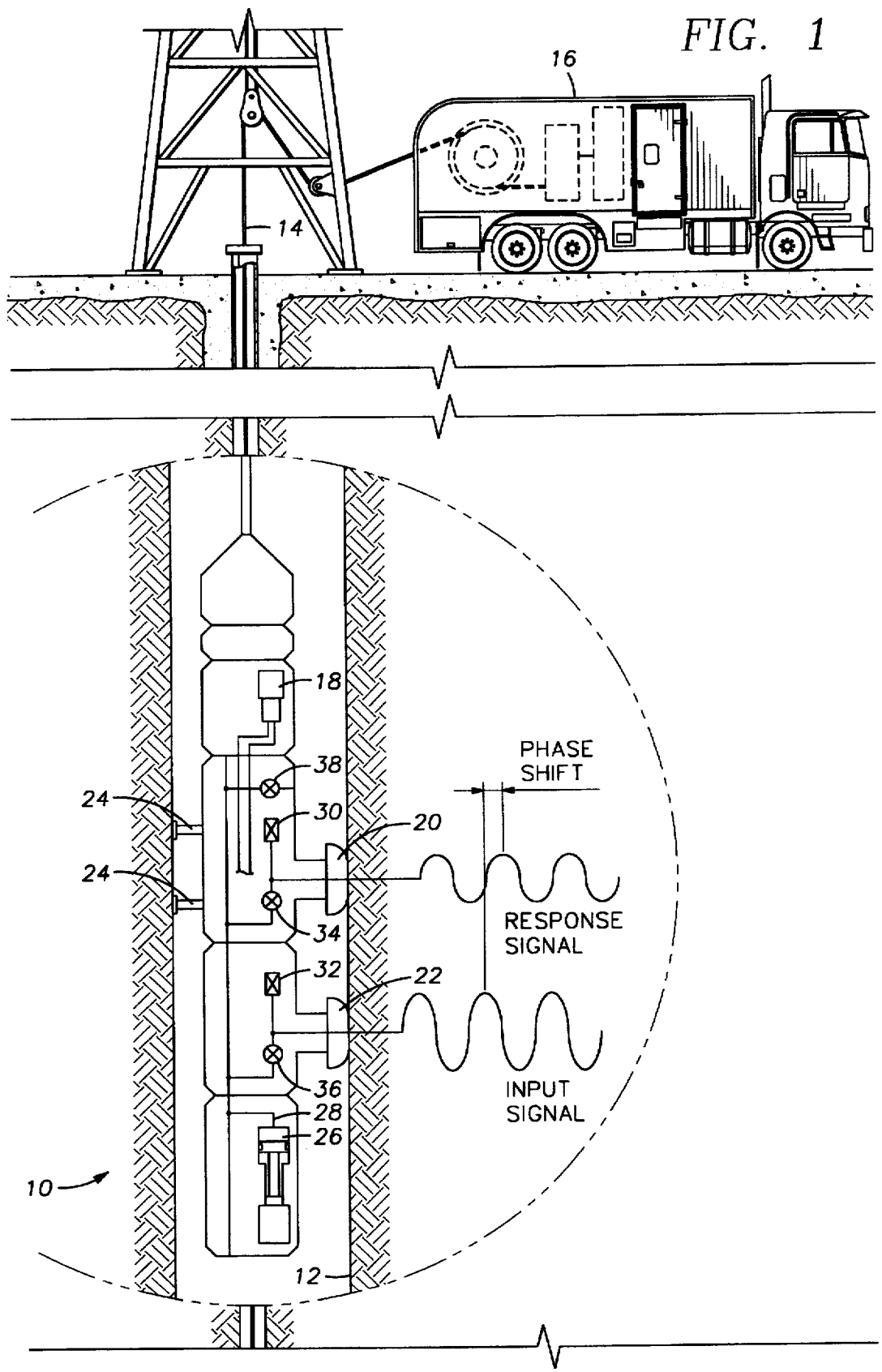
FIG. 1 is a schematic illustration of a first preferred embodiment of the present invention.

Referring first to FIG. 1, a wireline testing apparatus according to the present invention is generally designated at 10. Testing apparatus 10 is lowered into a borehole 12 by a cable 14 connected to truck 16. Many different types of wireline testing apparatus are well known in the art as is their manner of deployment. The present invention is positioned in a borehole and controlled in the same manner.

In the preferred embodiments, an electrical motor or electrohydraulic system 18 powers the other components in testing apparatus 10. Electrical power to operate the apparatus is transmitted through cable 14.

In a first preferred embodiment, testing apparatus 10 includes two probes 20 and 22 which are separated vertically but are positioned in the same azimuthal angle. In the preferred embodiment, probes 20 and 22 are spaced about 4 to about 10 inches apart. Probes 20 and 22 and back up pads 24 can be extended from testing apparatus 10 such that they engage the walls of borehole 12. Engagement of probes 20 and 22 with the wall of borehole 12 is necessary to isolate the probes from fluids contained in the borehole. Backup pads 24 are used to stabilize the tool and insure that probes 20 and 22 remain in place against the wall of borehole 12.

A reciprocating piston 26 controls the pressure and flow rates at the probes. Piston 26 is connected to probes 20 and 22 by suitable tubing 28. Piston 26 is designed such that it can generate a sinusoidal pressure wave as well as other pressure pulses.

High accuracy quartz gauges 30 and 32 are connected to probes 20 and 22 respectively. Gauges 30 and 32 are used to record the pressure at each probe. Probes 20 and 22 can be isolated from piston 26 by isolation valves 34 and 36. An equalization valve 38 can allow borehole fluids to enter tubing 28 when testing is terminated.

Figure 2:
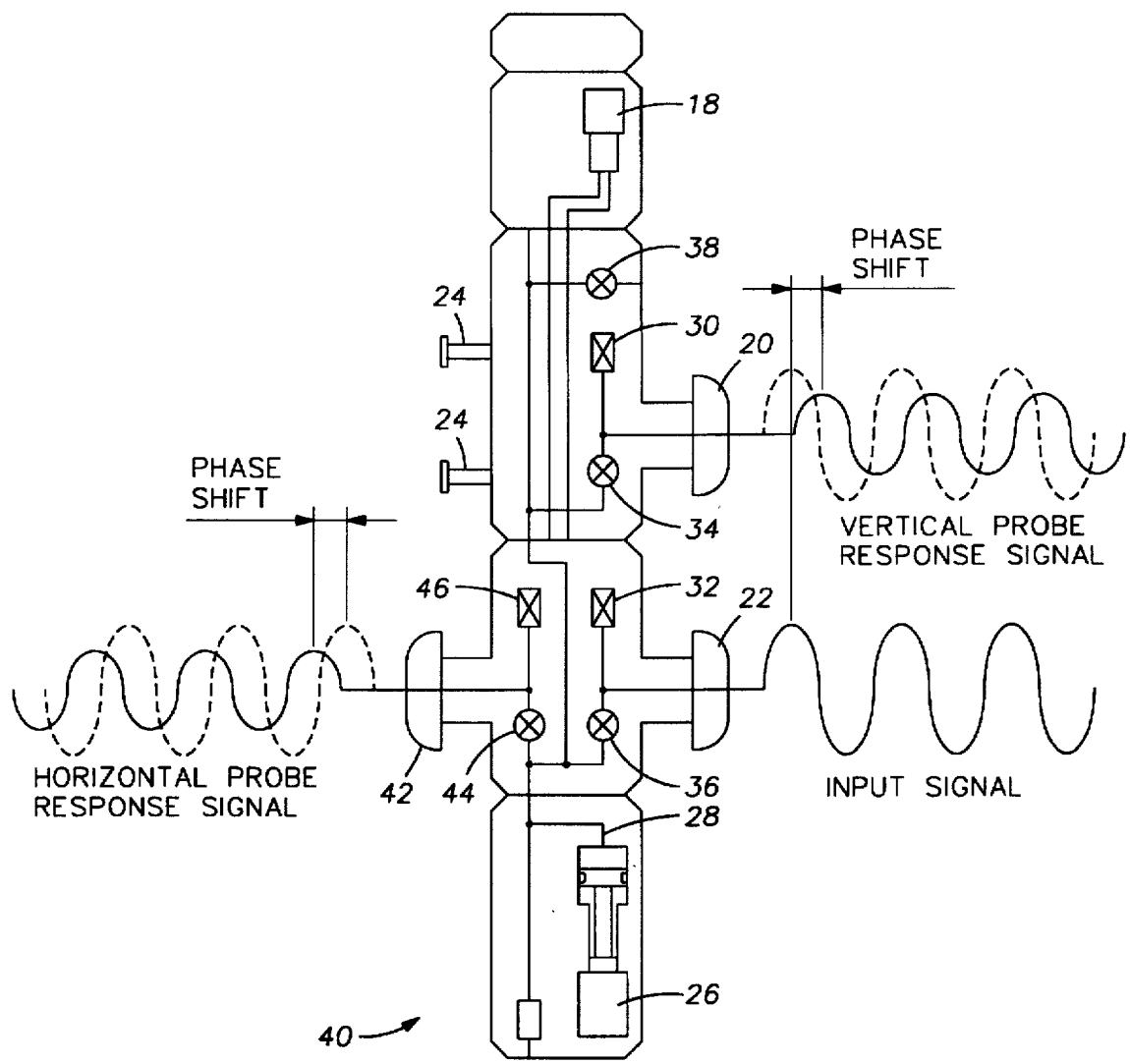
FIG. 2 is a schematic illustration of a second preferred embodiment of the present invention.

Reference is next made to FIG. 2 which illustrates a second preferred embodiment of a wireless testing apparatus 40. Apparatus 40 is essentially identical to testing apparatus 10 except for the addition of a third probe 42. In this preferred embodiment, probe 42 is positioned on the opposite side of testing apparatus 40 from probe 22 so that these probes will be horizontally offset when positioned within a borehole.

Probe 42 is connected to piston 26 by tubing 28. Probe 42 can be isolated from piston 26 with an isolation valve 44. A quartz pressure gauge 46 records pressures at probe 42.

Reference is again made to FIG. 1 to illustrate a first method of the present invention. A testing apparatus 10 is lowered into a borehole 12 on cable 14 from a truck 16. Electrical motor or electrohydraulic system 18 then causes probes 20 and 22 and backup pads 24 to be extended such that they engage the borehole walls. Valves 34, 36 and 38 are all closed as testing apparatus 10 is lowered into the borehole. Isolation valve 34 is then opened and piston 26 withdraws a small volume of fluid from the probe to create a drawdown which is recorded by the pressure gauge 30. In a preferred embodiment, the drawdown is about 5 to 10 cubic centimeters of fluid. Valve 34 is then closed affecting a build up of pressure at the probe.

Isolation valve 36 is then opened and piston 26 withdraws a small volume of fluid, about 5 to 10 cubic centimeters from probe 22. Valve 36 is then closed and the pressure is allowed to build up.

The pressure drawdowns and build ups through probes 20 and 22 are performed to insure that probes 20 and 22 are in hydraulic communication with the formation.

Valve 36 is again opened and piston 26 is reciprocated with a sinusoidal displacement to produce a pressure bearing wave or input signal at probe 22. The amplitude of the pressure wave is controlled by a feedback loop that determines the displacement of the piston. The pressure wave propagates in a diffusive manner to probe 20 which detects the response signal which is recorded with the isolated pressure gauge 30. The response signal detected at probe 20 has a diminished amplitude and a phase shift from the pressure wave generated at probe 22.

The time domain pressure measurements made by gauges 30 and 32 are processed by a microprocessor (not shown) connected to the gauges which can be located either in the tool or the truck 16. By comparing the amplitude and phase shift of the wave sensed by probe 20 with the wave generated by probe 22, an accurate estimate of permeability can be made.

A simple spherical transient flow model assuming an isotropic homogeneous medium, without flow line storage, and having a transmitter source cavity having an effective radius $R_W$ can be used to calculate the permeability or other properties. As an approximation, the effective radius $R_W$ may be taken as the probe radius. Using this model, the receiver to transmitter phase angle change satisfies the following equation:

$$\alpha_{Phase} = (r - r_w)\sqrt{\frac{\phi\mu c\omega}{2k}} \qquad 1$$

and the receiver to transmitter amplitude ratio satisfies the following equation:

$$\frac{A_{rec}}{A_{trans}} = \left(\frac{r_w}{r}\right) e - \left[(r - r_w)\sqrt{\frac{\phi\mu c\omega}{2k}}\right] \qquad 2$$

wherein:

r equals the receiver to transmitter actual spacing $r_w$ equals the effective radius of the probe c equals the compressibility of the formation fluid μ equals the viscosity of the formation fluid φ equals the porosity of the formation k equals the permeability of the formation ω equals the circular frequency of the sinusoidal motion.

In the first preferred embodiment, the distance between the probes is generally in the range of about 4 to about 10 inches. The frequency of the sinusoidal wave that is generated at the probe is generally in the range of about 1 to about 100 hertz.

In the second preferred embodiment, the tool is operated in the same manner but the addition of the third probe provides additional data useful in determining formation properties. With the third probe it is possible to determine differences in vertical and horizontal permeabilities by using phase delays and amplitude ratios obtained between probes 20 and 22, and 22 and 42 in FIG. 2.

In a third preferred embodiment, only a single probe, such as probe 22 is utilized. In this embodiment a gauge (not shown) is used to measure the peak-to-peak amplitude of displacement (flow rate) of piston 26. With this data, the peak-to-peak volume flow rate $Q_O$ can be calculated and the permeability or other properties of the formation can be determined using the following equations:

$$\frac{A}{Q_0} = \frac{1}{4\pi r_w^2 \sqrt{\frac{\phi c \omega k}{2\mu}} \sqrt{\left(1 + \frac{1}{r_w}\sqrt{\frac{2k}{\phi c \mu \omega}}\right)^2 + \left(1 + \frac{V}{4\pi r_w^2}\sqrt{\frac{2c\omega\mu}{\phi k}}\right)^2}} \quad 3$$

$$\phi = \arctan\left(\frac{1 + \frac{V}{4\pi r_w^2}\sqrt{\frac{2c\omega\mu}{\phi k}}}{1 + \frac{1}{r_w}\sqrt{\frac{2k}{\phi c \mu \omega}}}\right) \quad 4$$

wherein:

$Q_O$ equals peak-to-peak volume flow rate of the piston
V equals volume of the flow line including the piston
A equals the peak-to-peak pressure generated.

The present invention can also be used to determine permeabilities at different depths of investigation to obtain a permeability profile near the wellbore. This is accomplished by taking measurements at different frequencies at the same location and comparing the results. As the frequency increases, the amplitude at any given radius of investigation decreases.

While the invention has been described with respect to the presently preferred embodiments, it will be appreciated by those skilled in the art that changes and modifications can be made without departing from the scope or essence of the invention. For example, the probes can be oriented either vertically or horizontally as shown in FIGS. 1 and 2. Additionally, while the horizontal probe shown in FIG. 2 is directly opposed to the transmitter probe, other combinations of azimuthal angle and horizontal probe spacings can be used. Additionally, wave patterns other than sinusoidal waves can be used in the present invention; for example, a transient excitation can be used, provided amplitude ratios and phase delays are calculated from Fast Fourier Transform properties of the measured quantities (FFT-based calculations can be performed in hardware using DSP programmed chips or post processed using another computer system.) Accordingly, the scope of the invention is defined by the following claims rather than by the foregoing description. All changes or modifications which come within the range and meaning of equivalency of the claims are to be embraced within their scope.

What is claimed:

1. A formation tester comprising;
   a means for generating a pressure wave in a geological formation;
   a first probe in contact with said geological formation, said first probe operably connected to said pressure wave generating means and a means for sensing at least two properties of said generated pressure wave; and
   a second probe located a predetermined distance from and within the same azimuthal angle as said first probe, said second probe operably connected to a means sensing at least two properties of said generated pressure wave.

2. A formation tester as defined in claim 1 wherein said pressure wave generating means generates a sinusoidal pressure wave.

3. A formation tester as defined in claim 1 wherein said sensing means operably connected to said first and second probes each include a high accuracy quartz gauge for measuring the pressure of said wave.

4. A formation tester as defined in claim 3 further comprising means for comparing a property of said wave sensed at said first probe and at said second probe.

5. A formation tester as defined in claim 4 wherein one of said sensed properties comprises a phase shift of said pressure wave.

6. A formation tester as defined in claim 4 wherein one of said sensed properties comprises amplitude of said pressure wave.

7. A formation tester as defined in claim 1 wherein said pressure wave has a frequency between about 1 and about 100 hertz.

8. A formation tester as defined in claim 1 wherein the distance between said first probe and said second probe is between about four and ten inches.

9. A formation tester as defined in claim 1 further comprising a third probe located a predetermined distance from said first probe, said third probe operably connected to a means for sensing at least two properties of said generated pressure wave.

10. A formation tester comprising:
    a first probe for generating a sinusoidal pressure wave in a geologic formation and having means for sensing at least two properties of said wave;
    a second probe spaced a predetermined distance from said first probe and having means for sensing at least two properties of said generated pressure wave; and
    means for comparing a property of said wave sensed at said first probe and at said second probe.

11. A formation tester as defined in claim 10 wherein one of said properties comprises a phase shift of said pressure wave.

12. A formation tester as defined in claim 10 wherein one of said properties comprises amplitude of said pressure wave.

13. A formation tester as defined in claim 10 wherein said sensing means comprise high accuracy quartz gauges.

14. A formation tester as defined in claim 10 further comprising a third probe spaced a predetermined distance from said first probe and having means for sensing a least two properties of said generated pressure wave.

15. A formation tester as defined in claim 14 wherein said second probe is vertically spaced from said first probe and said third probe is horizontally spaced from said first probe.

16. A method of determining properties of a geologic formation comprising: providing a tool having a first probe and a second probe located therein within a borehole
   in a geologic formation; generating a pressure wave in said geologic formation with said first probe in said tool; sensing at least two properties of said wave at said first probe and said second probe and comparing
   changes in the properties of said pressure wave between said probes.

17. A method of determining properties of a geologic formation as defined in claim 16 wherein said changes in the properties of said pressure wave between said probes is used to determine permeability of said formation.

18. A method of determining properties as defined in claim 14 wherein one of said sensed property comprises the phase of said pressure wave.

19. A method of determining properties as defined in claim 16 wherein one of said sensed property comprises amplitude of said pressure wave.

20. A method of determining properties as defined in claim 16 wherein said pressure wave has a frequency between about one and about 100 hertz.

21. A formation tester comprising:
- a first probe for generating a pressure wave in a geological formation, said first probe having a high accuracy quartz gauge for measuring the pressure of said wave;
- a second probe located a predetermined distance from and within the same azimuthal angle as said first probe for sensing properties of said generated pressure wave, said second probe having a high accuracy quartz gauge for measuring the pressure of said wave;
- a reciprocating piston connected to said first probe for generating said pressure wave
- means for comparing a sensed phase shift of said pressure wave at said first and second probes.

22. A formation tester comprising:
- a first probe for generating a sinusoidal pressure wave in a geological formation and having means for sensing properties of said wave;
- a second probe spaced a predetermined distance from said first probe and having means for sensing properties of said generated pressure wave; and
- means for comparing a phase shift of said wave sensed at said first probe and at said second probe.

23. A method of determining properties of a geological formation comprising:
- providing a tool having a first probe and a second probe therein within a borehole in a geological formation;
- generating a pressure wave in said geological formation with said first probe in said tool; and sensing a phase shift of said wave at said first probe and said second probe and comparing changes in said phase shift of said pressure wave between said probes.

* * * * *